United States Patent
Stavely et al.

(10) Patent No.: US 8,045,009 B2
(45) Date of Patent: Oct. 25, 2011

(54) IMAGE-EXPOSURE SYSTEMS AND METHODS USING DETECTING MOTION OF A CAMERA TO TERMINATE EXPOSURE

(75) Inventors: Donald J. Stavely, Windsor, CO (US); Christopher A. Whitman, Ft. Collins, CO (US); Gregory V. Hofer, Loveland, CO (US); David K. Campbell, Loveland, CO (US); Jason E. Yost, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2008 days.

(21) Appl. No.: 10/842,222

(22) Filed: May 10, 2004

(65) Prior Publication Data
US 2005/0248660 A1 Nov. 10, 2005

(51) Int. Cl.
*H04N 5/228* (2006.01)
(52) U.S. Cl. ............. 348/208.16; 348/208.3; 348/208.4; 348/208.12
(58) Field of Classification Search ............. 348/208.16, 348/208.12, 208.4, 333.11, 333.12
See application file for complete search history.

(56) References Cited

U.S. PATENT DOCUMENTS

| | | | |
|---|---|---|---|
| 5,124,741 A | 6/1992 | O'Such et al. | |
| 5,585,884 A | 12/1996 | Onuki | |
| 5,708,863 A | 1/1998 | Satoh et al. | |
| 6,240,253 B1 | 5/2001 | Yamaguchi et al. | |
| 6,292,215 B1 * | 9/2001 | Vincent | 348/169 |
| 6,429,895 B1 | 8/2002 | Onuki | |
| 6,441,848 B1 * | 8/2002 | Tull | 348/208.99 |
| 6,603,508 B1 * | 8/2003 | Hata | 348/229.1 |
| 6,654,559 B2 | 11/2003 | Aoyama | |
| 6,668,648 B2 * | 12/2003 | Karasawa et al. | 73/504.08 |
| 7,239,342 B2 * | 7/2007 | Kingetsu et al. | 348/208.4 |
| 2002/0101514 A1 * | 8/2002 | Watanabe | 348/211 |
| 2004/0239771 A1 | 12/2004 | Habe | |

FOREIGN PATENT DOCUMENTS

| | | | |
|---|---|---|---|
| JP | 2001-045361 | * | 2/2001 |
| JP | 200145361 | | 2/2001 |
| JP | 2003-098567 | * | 4/2003 |
| JP | 2003244479 | | 8/2003 |

* cited by examiner

*Primary Examiner* — Luong T Nguyen

(57) ABSTRACT

Image-exposure systems and methods are disclosed. One embodiment of the system includes a motion detecting device, and logic configured to determine when to terminate an image-exposure based on detected motion of a camera.

32 Claims, 8 Drawing Sheets

IMAGE-EXPOSURE SYSTEMS AND METHODS USING DETECTING MOTION OF A CAMERA TO TERMINATE EXPOSURE

BACKGROUND

Cameras are often limited in their ability to produce sharp pictures by how steadily they can be held by a user. When a camera shutter remains open for an extended period of time, motion occurring during this open interval is visible in a snapshot. The visibility of the motion as a result of the combination of the open shutter and motion is referred to as motion blur. Sometimes the introduction of motion blur into a captured image is purposeful, such as to capture the perceptual effect of high-speed motion more accurately or to provide a particular artistic effect. But for the photographer that desires a crisp picture, motion blur caused by "camera shake" presents an obstacle to that goal. Camera shake is primarily the result of rotational (e.g., pitch and yaw) motion of the camera.

Camera shake can vary depending on the focal length. Longer focal lengths magnify the image, and thus the perceived shake due to rotational motion is also magnified. A rule of thumb from 35 mm (millimeter) film photography is that, to avoid motion blur resulting from camera shake, hand-held exposure times are selected to be less than the inverse of the focal length. For example, at a 60 mm focal length, the exposure should be 1/60 second or less. Considering the rule of thumb, there are various options to reduce motion blur. One option is to use a faster lens, which allows a shorter exposure time for the same scene brightness. Digital cameras typically use the fastest lens that is practical in terms of cost, size, and image quality goals. Lens speeds of F/2 to F/2.8 (F referring to the F-stop, which is a calibrated measure of the ratio of a lens maximum aperture to its focal length, the inverse of which is an indication of lens speed) are typical. Faster lenses than this are often significantly more expensive and bulky.

Other approaches have been developed to address motion blur. One popular approach is active image stabilization of the lens system. "Image stabilization" refers to a process that attempts to stabilize an image on an image sensor or on a photographic film during the course of an exposure. In an image-stabilized lens system, a lens or prism disposed within the lens system is moved in such a way that the image path is deflected in the direction opposite the camera motion. The lens or prism is typically driven by two "voice coil" type actuators, which respond to signals generated by gyroscopes or accelerometers that sense rotational motion of the camera.

Liquid-filled prisms have been used for image stabilization. Such structures typically include two flat plates that form the front and back surfaces of the prism, surrounded by a flexible seal to hold the liquid in place. Actuators "squeeze" the prism by the edges of the plates, refracting the beam in the direction of the thicker side of the prism.

Moveable lens systems have also been used for image stabilization. In such systems, actuators shift the lens laterally, "decentering" the image provided on an image sensor horizontally and vertically. The beam is deflected proportionally to the power of the lens (positive or negative).

One problem with the image stabilization approaches described above concerns the limited space available within the lens system. For example, the moveable lens is typically located at or near the aperture stop of the lens system, which is a very crowded area in a camera, especially in compact zoom lens system designs. Additionally, the liquid prism approach is implemented using a separate, additional element to the standard lens system. Thus, the prism generally has to be fitted into the optical path. Further, lenses for these approaches are often specially designed to accommodate image stabilization, making them bulky, costly to fabricate, and complex in operation.

Another approach to image stabilization is leaving the lens intact and moving the image sensor. The image sensor may be fixed to a stage that is moveable in the x- and y-direction. The image sensor can be shifted by actuators in response to sensed motion, matching the movement of the image. One problem with this approach is that motion in the z-direction and in its tilt direction must be very carefully controlled, otherwise the image will not remain in focus. For example, out-of-plane motions of as little as 10 micrometers may cause some or the entire image to lose focus. An additional problem concerns movement of the sensor and the need for flexibly connecting the large number of signal lines from the camera control circuitry to the sensor.

SUMMARY

One embodiment of an image-exposure method comprises detecting motion; and determining when to terminate an image exposure based on the detected motion of a camera.

One embodiment of an image-exposure system comprises a motion detecting device; and logic configured to determine when to terminate an image exposure based on detected motion of a camera.

One embodiment of an image-exposure system comprising means for detecting motion; and means for terminating an image exposure based on whether a threshold level of detected motion of a camera has occurred.

One embodiment of a computer program stored on a computer-readable medium comprises logic configured to detect motion; and logic configured to terminate an image exposure based on detected motion of a camera.

BRIEF DESCRIPTION OF THE DRAWINGS

The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of an image-exposure system and method, herein referred to as an image-exposure system for brevity. The image-exposure system uses motion of the camera during exposure of an image to determine when to terminate the exposure. If the camera is steady, the exposure is extended to its maximum time, as determined by scene brightness and the other camera settings, such as lens focal length, aperture, etc. However, in the presence of camera motion, the exposure may be terminated early to reduce motion blur. The underexposed image is gained-up to its nominal brightness as part of the functionality of the image-exposure system. "Gaining-up" or the like refers to a process by which the image-exposure system multiplies each pixel value by a constant chosen to compensate for the shorter image exposure. For example, if the exposure was terminated at ¾ of its full duration, then each pixel value can be multiplied by 4/3 or 1.33.

Figure 1:
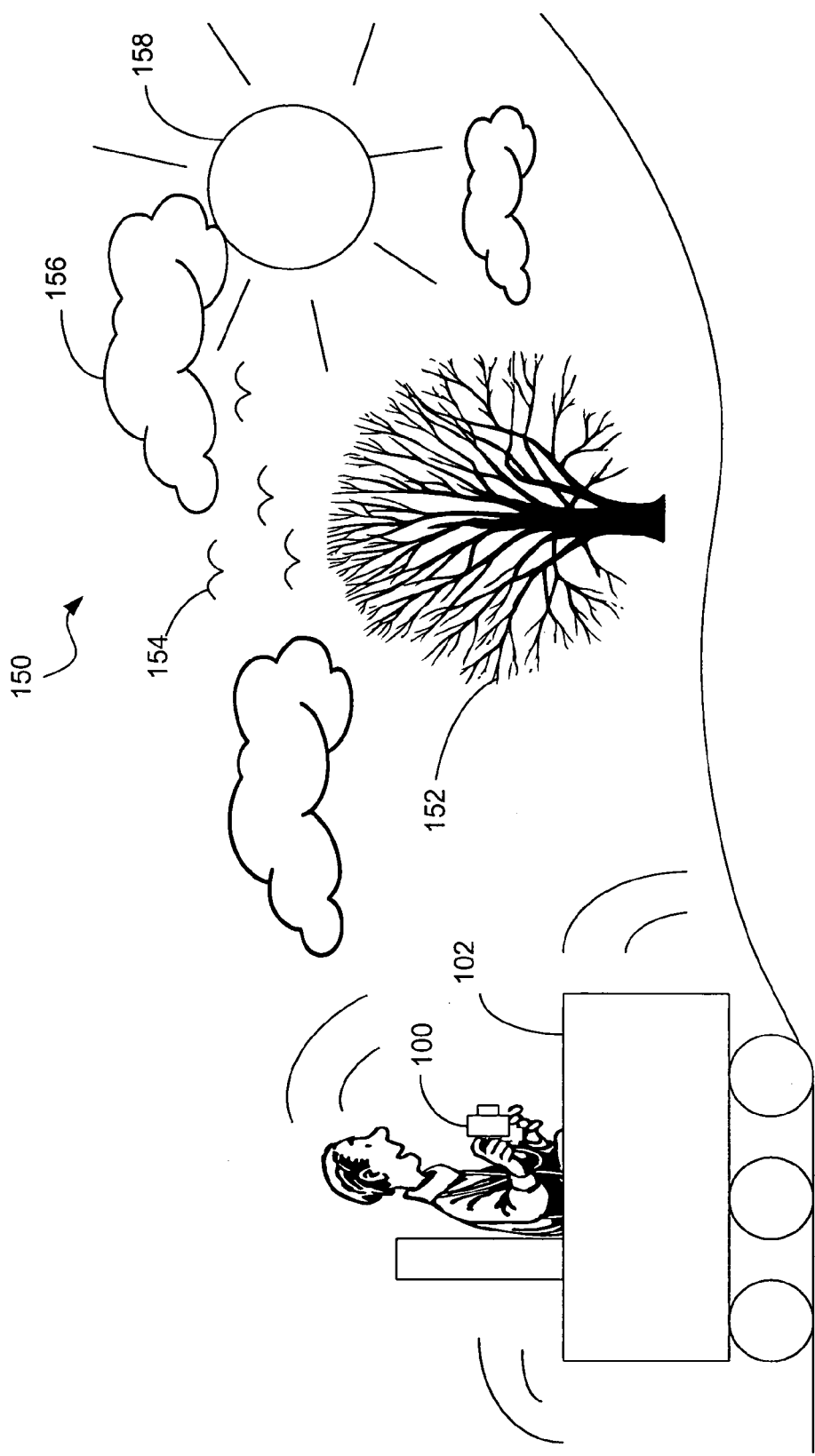
FIG. 1 is a schematic diagram of an example implementation for a digital camera in which various embodiments of an image-exposure system can be implemented.
Figure 3:
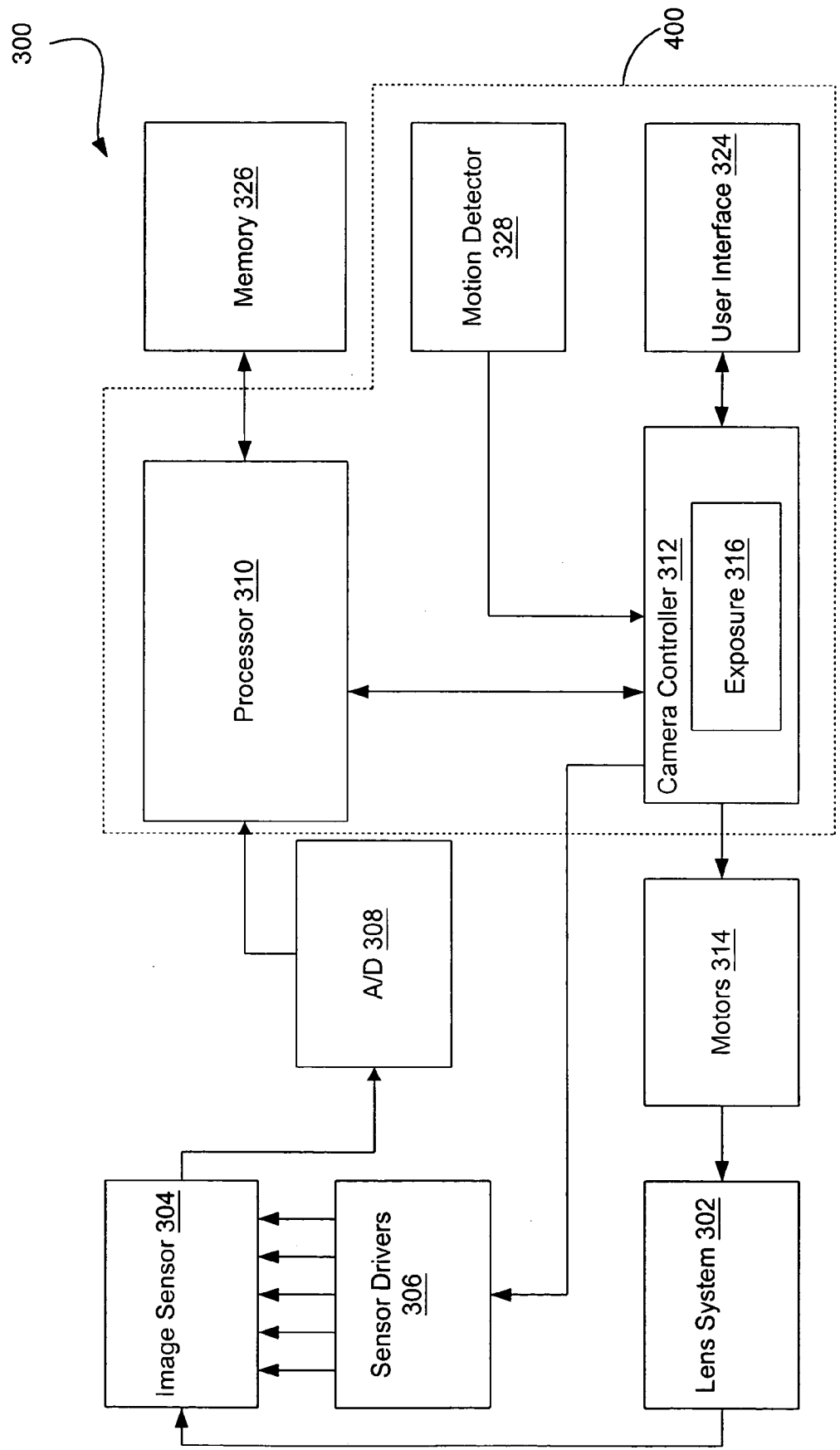
FIG. 3 is a block diagram that illustrates an embodiment of an image-exposure system of the digital camera shown in FIGS. 2A and 2B.
Figure 4:
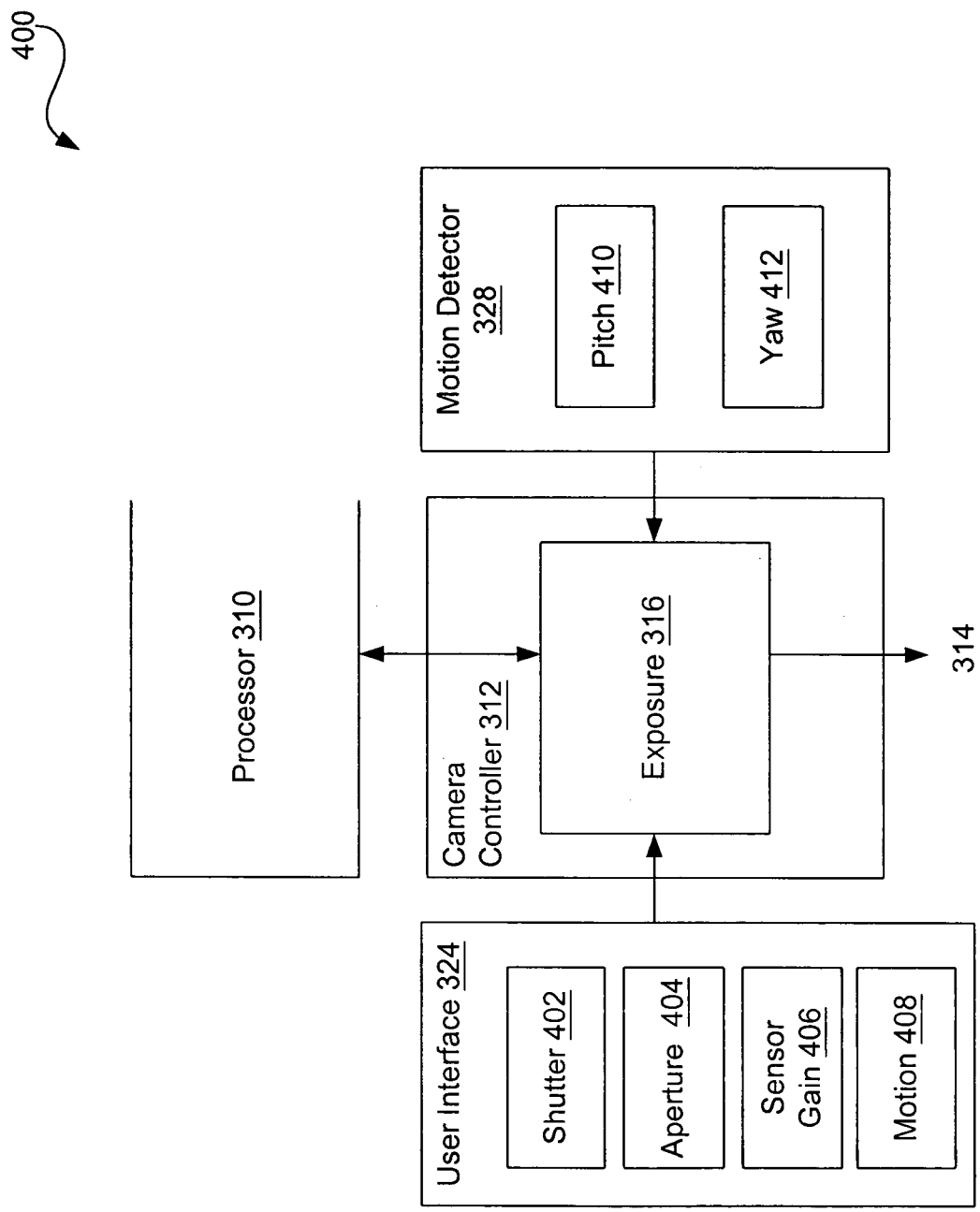
FIG. 4 is a block diagram that illustrates a portion of the image-exposure system shown in FIG. 3.
Figure 5:
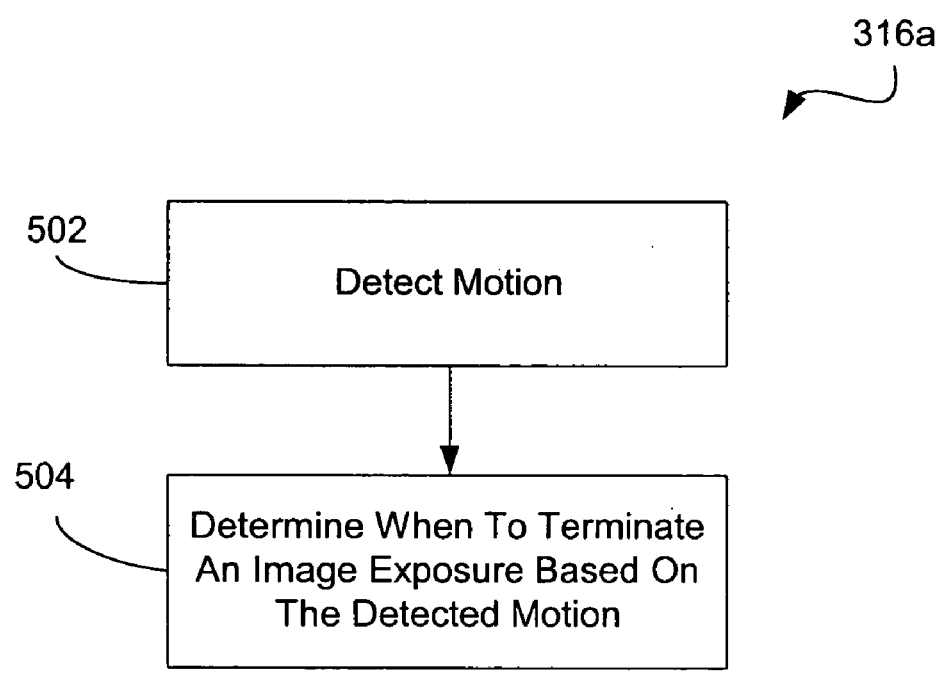
FIG. 5 is a flow diagram that illustrates a generalized image-exposure method embodiment of the image-exposure system shown in FIG. 3.

An example implementation of a digital camera that utilizes an image-exposure system is shown in FIG. 1. The digital camera of FIG. 1 is further illustrated in FIGS. 2A and 2B. FIGS. 3 and 4 are used to show various components of embodiments of an image-exposure system. FIGS. 5 and 6 provide an illustration of various embodiments of an image-exposure method.

FIG. 1 is a schematic diagram of an example implementation for a digital camera that provides an illustration of the type of circumstances that can benefit from an image-exposure system. A user is shown travelling in an all-terrain vehicle (ATV) 102 on a bumpy road in pursuit of scenes of interest for taking pictures. The user is taking pictures of an outdoor scene 150 with his digital camera 100 while driving, which causes camera shake and thus increases the likelihood of motion blur. The outdoor scene 150 includes a tree 152, birds 154, clouds 156, and the sun 158. Although an extreme example giving rise to camera shake is shown, it will be understood that camera shake can be a problem (worthy of correction by the image-exposure system) in simple implementations, such as when a user tries to hand-hold a camera with a long focal length lens on steady ground.

Figure 2A:
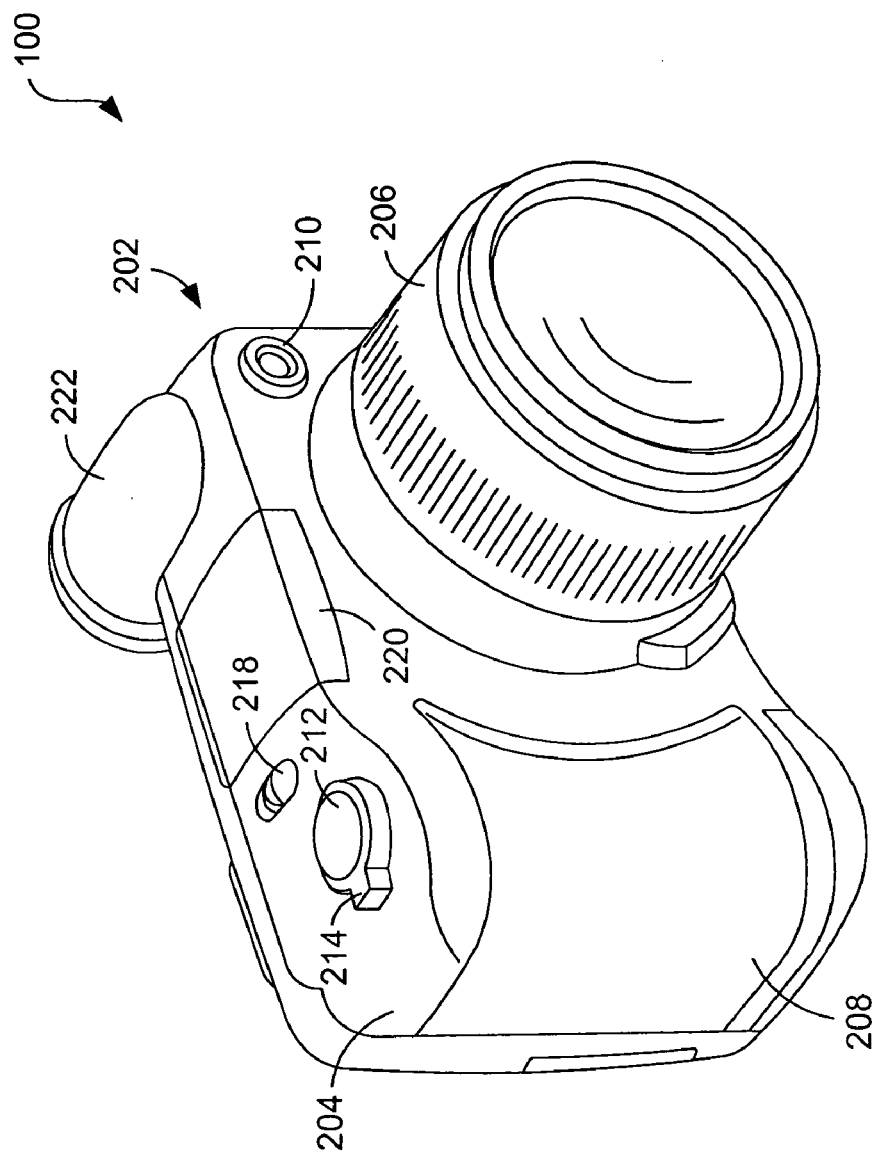
FIGS. 2A and 2B are schematic diagrams of the example digital camera of FIG. 1.
Figure 2B:
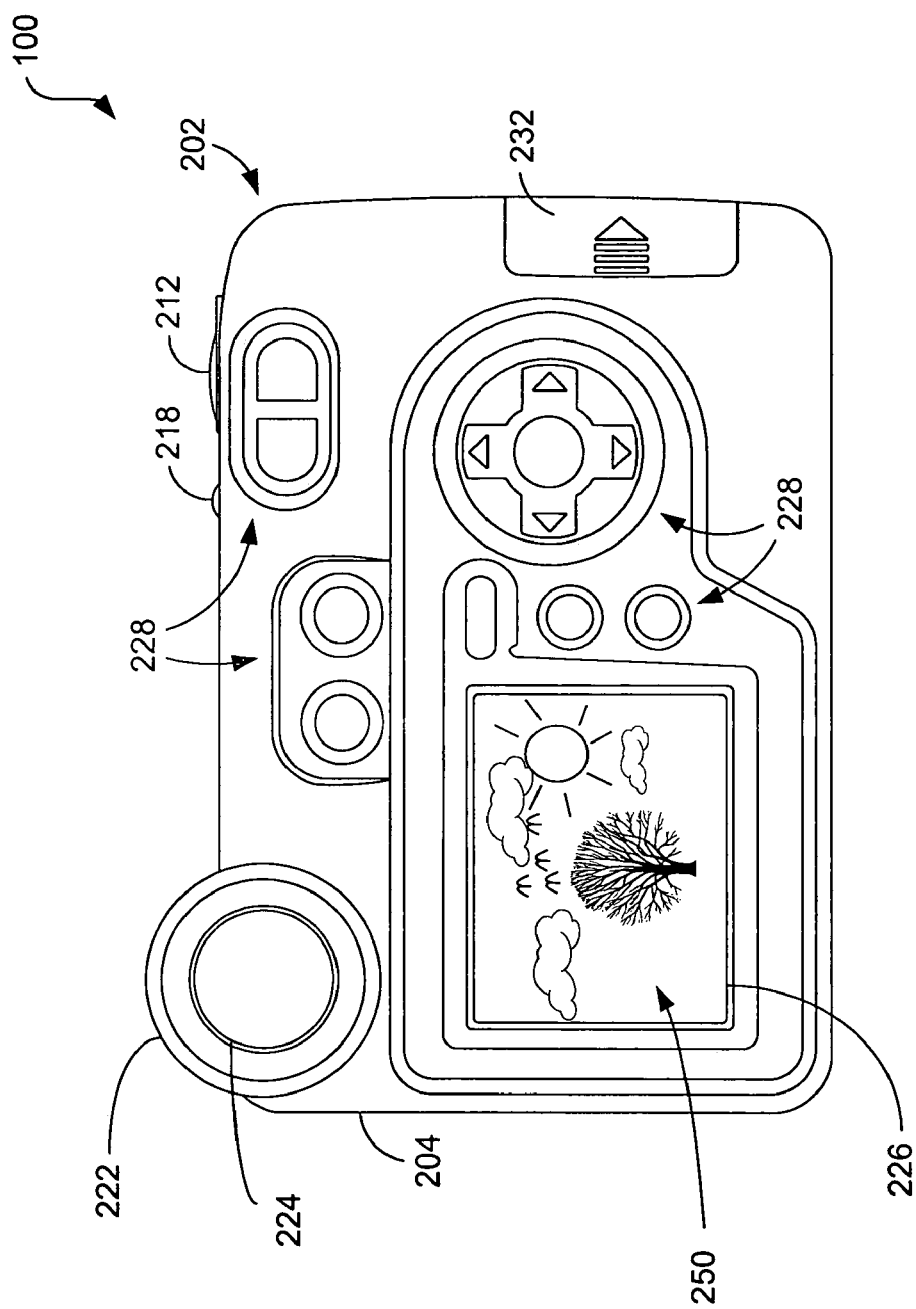

FIGS. 2A and 2B are schematic diagrams of the example digital camera 100 of FIG. 1. As indicated in FIGS. 2A and 2B, the digital camera 100 includes a body 202 that is encapsulated by an outer housing 204. The digital camera 100 further includes a lens barrel 206 that, by way of example, houses a zoom lens system. Incorporated into the front portion of the camera body 202 is a grip 208 that is used to grasp the camera and a window 210 that, for example, can be used to collect visual information used to automatically set the camera focus, exposure, and white balance.

The top portion of the digital camera 100 is provided with a shutter-release button 212 that is used to open the camera shutter (not visible in FIGS. 2A and 2B). Surrounding the shutter-release button 212 is a ring control 214 that is used to zoom the lens system in and out depending upon the direction in which the control is urged. Adjacent the shutter-release button 212 is a switch 218 that is used to control operation of a pop-up flash 220 (shown in the retracted position) that can be used to illuminate objects in low light conditions.

Referring now to FIG. 2B, which shows the rear of the digital camera 100, further provided on the camera body 202 is a display 226. The display 226 provides an area where captured images and GUIs (graphics user interfaces) are presented to the user, and is typically used to compose shots (e.g., using a preview mode) and review captured images (e.g., using a review mode). The display 226 can also be used, in cooperation with the various control buttons 228, to prompt a menu of the various user configurable settings, such as aperture settings, shutter speed settings, sensor gain (ISO or equivalent film speed), and motion settings, as explained below. In some embodiments, such settings can be manipulated via dedicated buttons (not shown) for each respective function. Shown in the display 226 is the captured image 250 corresponding to the outdoor scene 150 of FIG. 1 as it may appear in a "review" mode. The display 226 can comprise a liquid crystal display (LCD) screen.

Optionally, the back panel of the digital camera 100 may also include an electronic viewfinder (EVF) 222 that incorporates a microdisplay (not visible in FIGS. 2A and 2B) upon which captured images and GUIs can be presented to the user. The microdisplay may be viewed by looking through a view window 224 of the viewfinder 222. Various control buttons 228 are provided on the back panel of the digital camera body 202, as referenced above. These buttons 228 can be used, for instance, to scroll through menu items, such as configurable camera settings, to scroll through captured images shown in the display 226, and to prompt various edit screen functions and preview and review modes. The back panel of the camera body 202 further includes a compartment 232 that is used to house a battery and/or a memory card.

FIG. 3 is a block diagram of an embodiment of an image-exposure system 300 as implemented in the example digital camera of FIGS. 2A and 2B. The image-exposure system 300 includes a lens system 302 that conveys images of viewed scenes to one or more image sensors 304. By way of example, the image sensors 304 comprise charge-coupled devices (CCDs) that are driven by one or more sensor drivers 306. Complementary metal-oxide semiconductor (CMOS) sensors may be utilized as well. The analog image signals captured by the sensors 304 are then provided to an analog-to-digital (A/D) converter 308 for conversion into binary code that can be processed by a processor 310.

A camera controller 312 is in bi-directional communication with the processor 310. The camera controller 312 includes an exposure module 316, which provides exposure programming for the digital camera 100 (FIGS. 2A and 2B). Exposure programming can include functionality for controlling aperture priority, shutter priority, motion priority, and sensor gain settings. The exposure module 316 receives pitch and yaw signals from a motion detector 328, and uses the motion information to optimize the settings of the other exposure programming variables as well as to make a determination as to whether to terminate an image exposure. Responsive to detecting motion, the motion detector 328 sends a signal to the exposure module 316 corresponding to the camera motion. The exposure module 316 can determine the camera rotational motion from the signal level or signal coding sent by the motion detector 328, such as through an algorithmic determination or through use of an association or look up table stored in memory 326. The motion detector 328 can be an accelerometer, gyroscope, among other motion detecting devices that sense motion.

Operation of the sensor drivers 306 is controlled through the camera controller 312 (e.g., via exposure module 316), as are one or more motors 314 (including a shutter solenoid) that are used to drive the lens system 302 (e.g., to adjust focus and zoom, shutter speed, and aperture). Operation of the exposure module 316 may be adjusted through manipulation of the user interface 324. The user interface 324 comprises the various components used to enter selections and commands into the digital camera 100 (FIGS. 2A and 2B) and therefore at least includes the control buttons 228, the shutter-release button 212, and the ring control 214 identified in FIGS. 2A and 2B. A portion 400 of the image-exposure system 300 includes the processor 310, the motion detector 328, the user interface 324, the camera controller 312, and exposure module 316, as described in further detail below.

The digital image signals are processed in accordance with instructions from the camera controller 312 in cooperation with the processor 310. In some embodiments, the functionality of the camera controller 312 and the processor 310 can be combined in a single component. The memory 326 can include volatile and non-volatile memory. Processed images may then be stored in memory 326 or other memory not shown.

The exposure module 316 can be implemented in hardware, software, firmware, or a combination thereof. When implemented in hardware or firmware, the exposure module 316 can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

When the exposure module 316 is implemented in software, the exposure module 316 can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The exposure module 316 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

FIG. 4 is a block diagram that illustrates the portion 400 of the image-exposure system 300 shown in FIG. 3. Referring to FIG. 4, and with continued reference to FIG. 3, the portion 400 will be used to further illustrate the various principles of operation of the image-exposure system 300. The portion 400 includes the processor 310, the user interface 324, camera controller 312 and exposure module 316, and the motion detector 328. The exposure module 316 receives signals from the components of the user interface 324 and motion detector 328, processes the signals, and responsively sends instructions to the motors 314 to make adjustments to the lens system 302 to provide the desired exposure.

In particular, the exposure module 316 receives input on shutter speed, aperture setting, gain, and motion to make a determination about how to implement image exposure. The user interface 324 includes functionality for enabling user selection of the various exposure control parameters, sometimes known as priority selections. Priority selections provide a mechanism for a photographer or other user to convey his or her intent to the digital camera 100 (FIGS. 2A and 2B) and allow the exposure module 316 to set-up all other camera settings according to that expressed intent. In a priority mode, one or more parameters are fixed and the others are automatically set based on, for example, scene conditions. The user interface 324 includes a shutter interface 402, aperture interface 404, sensor gain interface 406, and motion interface 408. The shutter interface 402 provides for shutter priority functionality. The shutter interface 402 can include a dedicated button, knob, or other manual control (not shown), or may include the combination of control buttons 228 and the display 226 from which a user can select a shutter priority option. Shutter priority refers to operation of the exposure module 316 whereby the user enters (through knob adjustment or selection in the display 226) the shutter speed and the exposure module 316 determines the aperture needed to get the optimal image exposure.

The aperture interface 404 provides for aperture priority functionality. Aperture priority refers to operation of the exposure module 316 whereby the user sets (similar to shutter priority, e.g., through knob adjustment or selection in the display 226) the aperture and the exposure module 316 determines the shutter speed needed to get the optimal exposure.

The sensor gain interface 406, adjusted in similar manner to the other interfaces described above, provides sensor gain functionality (e.g., for adjusting the equivalent film speed, such as ISO 100, 200, 400, etc.). For example, in low-light conditions, the aperture may be wide open and the shutter speed may be slowed to a low-speed setting. At these camera settings, camera shake may be more pronounced. The sensor gain interface 406 may be adjusted to expose the sensor 304 partially, thus availing the camera 100 (FIGS. 2A and 2B) of less than the entire dynamic range of the sensor. By exposing a portion of the sensor 304, the image is under-exposed. The exposure module 316 will effect the gain-up of the image to provide a nominal exposure (increase the brightness and improve color quality to appear as a normal exposure). The image can be gained-up after A/D conversion. For example, the processor 310, under direction of the exposure module 316, can read a buffer (not shown) in memory 326 and retrieve the images for processing (e.g., color processing, tone processing, compression processing, etc.). During processing, the processor 310, under direction of the exposure module 316, can digitally multiply each pixel value by a defined constant to provide the desired gain. The full range of the sensor 304 and the A/D (analog-to-digital) converter 308 are used as in other auto-exposure modes. In some embodiments, the image can be gained-up during the readout of the sensor 304, and before it gets buffered in memory 326. For example, under the direction of the exposure module 316, the gain-up can be done with a programmable analog gain stage (not shown) disposed between the sensor 304 and the A/D converter 308.

The motion interface 408 provides for motion priority functionality. Motion priority refers to operation of the exposure module 316 whereby the user sets (in similar manner to settings described above) a threshold value of motion, beyond which exposure is terminated and any resulting underexposed image is gained-up to obtain a nominal image exposure. The exposure module 316 can use motion information to make a more optimal trade-off between the various parameters (e.g., shutter speed, aperture, gain). For example, the threshold level may be set at a higher tolerance for motion for standard lenses as opposed to telephoto lenses.

Motion priority may be a separately-settable mode, like shutter priority and aperture priority modes. It may be manually set, or can be set automatically based on other camera settings and scene conditions. A motion priority mode of the exposure module 316 controls the shutter speed based on focal length and detected motion, and the aperture and gain are automatically set. In other words, motion of the camera that exceeds a threshold level of motion triggers termination of an image exposure, the threshold level dependent on the focal length of the lens system 302.

As mentioned above, there is a close interaction between motion information and shutter speed. The exposure module 316 evaluates how steadily the camera 100 (FIGS. 2A and 2B) is being held versus the shutter speed that is being requested. Generally, the rule of thumb from 35 mm film photography (note that this rule of thumb applies to other film or digital formats, but the lens focal length must be scaled accordingly) is that a sharp image may be obtained when hand-holding the camera when the shutter speed is approximately equal to the inverse of the focal length of the lens of the lens system 302 (FIG. 3). For example, if a user was taking a snapshot with a camera having a 300 mm (millimeter) telephoto lens, the shutter speed should be at 1/300 of a second.

With motion information, a more intelligent decision can be made by the exposure module 316 about the image exposure required given the conditions and priorities of the digital camera 100. Thus, in some embodiments, the motion priority mode can be used with other modes. For example, in an aperture mode, the user can set the aperture, and the exposure module 316 can determine the shutter speed based on motion and gain (similar to equivalent film speed). For example, using aperture priority, a low-light condition with a shaky digital camera 100 may result in the prescribed rules of thumb being inadequate. The exposure module 316, having motion information, may choose to under-expose the image and use the sensor gain to gain-up the image back to what appears as a normal exposure.

In some embodiments, other camera mode settings may not explicitly set one parameter. For example, some cameras have action mode, portrait mode, and/or night mode. These are automatic modes that set all the parameters with a different emphasis. The manual or automatic motion priority setting can also be implemented with these other mode settings.

Thus, the exposure module 316 receives motion information from the motion interface 408 and the motion detector 328 in addition to shutter, aperture, and/or sensor gain information to provide an image exposure that prevents or significantly reduces motion blur. Additionally, the exposure module 316 receives pre-exposure information from the sensor 304 (after digitized and processed at the A/D converter 308 and processor 310, respectively). The exposure module 316 uses this pre-exposure information to provide auto-focus functionality and to anticipate what exposure settings may be needed for the main exposure.

In some embodiments, exposure programming may be entirely automatic, in which case functionality for aperture priority, shutter priority, sensor gain, and/or motion priority may be integrated into the logic of the exposure module 316 and performed without user input. In such embodiments, the exposure module 316 attempts to always provide the optimal exposure as determined by the light conditions, focal length, camera settings, etc. For example, motion priority may be automatically used at longer focal lengths when shutter settings would exceed rule of thumb focal lengths.

The motion detector 328 includes a pitch component 410 and a yaw component 412. Pitch and yaw motions (e.g., rotational motion) of the camera are primarily responsible for vertical and horizontal blur (respectively) in the resulting image. The pitch component 410 includes functionality for providing the detection and signal processing of pitch motion of the digital camera 100 (FIGS. 2A and 2B). For example, the pitch component 410 may comprise a gyroscope (e.g., a solid-state rate gyroscope, micro-electro-mechanical piezoelectric gyroscope, etc.) and interface or A/D converter (not shown) that receives signals sent from the gyroscope in response to camera motion.

Similarly, the yaw component 412 includes functionality for providing the detection and signal processing of yaw motion of the digital camera 100 (FIGS. 2A and 2B). The yaw component 412 may comprise a gyroscope and an interface or A/D converter (not shown) that receives signals sent from the gyroscope in response to camera motion. The gyroscope is generally insensitive to other motions (e.g., linear motions of up and down, left and right, forward and back, as well as rotational motions in the other axes). In other words, each gyroscope is generally sensitive to motion in only one rotational motion, depending on its orientation with respect to the camera.

The motion detector 328 can be configured in some embodiments with other mechanisms to sense rotational motion. For example, rotation or tilt sensors can be used. Alternatively, rotational acceleration can be measured with accelerometers. For example, two linear accelerometers can be separated by a small distance, and the difference between their output can be calculated. This calculation can be used to cancel out the "common mode" linear acceleration seen equally by both accelerometers, leaving differential or rotational acceleration.

In some embodiments, a CMOS sensor or other sensor architecture may be used to measure motion during exposure, without the need for separate motion sensors. If the sensor architecture supports a non-destructive read capability, portions of the scene can be periodically read by the exposure module 316 and the successive frames can be compared to detect motion.

Note that the motion priority mode may not be appropriate for following a moving subject. For example, a photographer panning the digital camera 100 (FIGS. 2A and 2B) to follow a bicyclist may wish to obtain an image of a sharp bicyclist and a blurred background. Depending on the implementation, motion priority may try to stop the background, which may not be what the photographer intended. One solution to avoid losing the desired effect is to make the exposure module 316 insensitive to smooth motion (velocity) of the digital camera 100, and trigger on changing motion (acceleration). For example, pre-exposure motion may be considered as well. If the digital camera 100 is smoothly panning prior to the exposure, the exposure module 316 can operate under the assumption that continued smooth panning is an intended motion. In this case, the exposure module 316 would stop the exposure when there was a significant change in this motion.

If accelerometers are used, they are typically insensitive to constant velocity (their output is zero when velocity is constant). Velocity is derived as the integral of acceleration. This integration operation can be performed by the exposure module 316 or other components in analog or digital domains. The bandwidth of the integrator and its reset mechanism can be used to affect how the exposure module 316 responds to intended and unintended motions.

FIG. 5 is a flow diagram that illustrates a generalized methodology employed by the exposure module 316 of FIGS. 3 and 4. The exposure method 316a comprises the steps of detecting motion (step 502) and determining when to terminate an image exposure based on the detected motion of a camera (step 504).

FIG. 6 illustrates another exposure method 316b that provides further detail into the operation of the exposure module 316 of FIGS. 3 and 4. Step 602 includes receiving input corresponding to the camera mode. As described above, the camera mode may be set in an aperture priority mode, shutter priority mode, sensor gain mode, or motion priority mode. Step 604 includes receiving an indication that the camera shutter is in the half-way position (designated S1), which triggers autoexposure and autofocus functionality. Step 606 includes implementing auto-exposure processing. The auto-exposure process facilitates auto-focus and other camera settings as it provides a glimpse of the main exposure that is to come. Step 608 includes calculating the aperture and shutter speed. The shutter speed may be set based on selecting the shutter priority mode, and thus the aperture setting would be calculated based on the information provided during the auto-exposure process. Similarly, the aperture may be set according to an aperture priority mode selected, and thus calculation of the shutter speed is performed. Step 610 includes receiving an indication that the camera shutter is in the full-down position (designated S2), which triggers the actual image exposure.

Step 612 includes commencing image exposure. The threshold for shortened image exposure may be a function of focal length and detected motion. In addition, the time between the S1 and the S2 inputs of the shutter may add additional information as to the user's intent. For example, "poking" the shutter could trigger a quick exposure. A long pause between S1 and S2 inputs could trigger functionality to handle smooth panning as described above.

Step 614 includes monitoring camera motion 614. The exposure module 316 (FIG. 3) may poll logic of the motion detector 328 (FIG. 3) periodically, or the motion detector 328 may send control signals that are unsolicited by the exposure module 316.

Figure 6A:
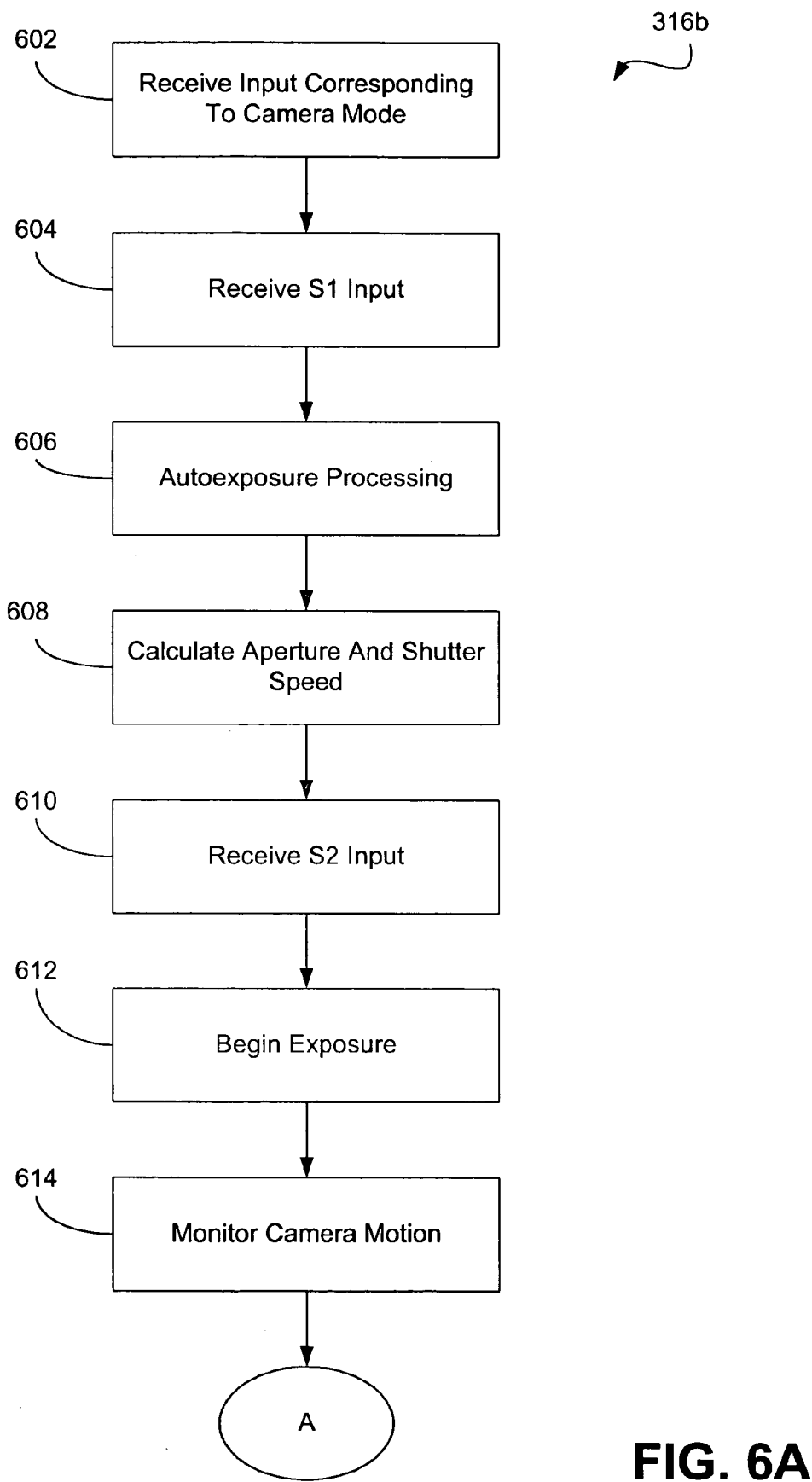
FIGS. 6A-6B are flow diagrams that illustrate an image-exposure method embodiment of the image-exposure system shown in FIG. 3.
Figure 6B:
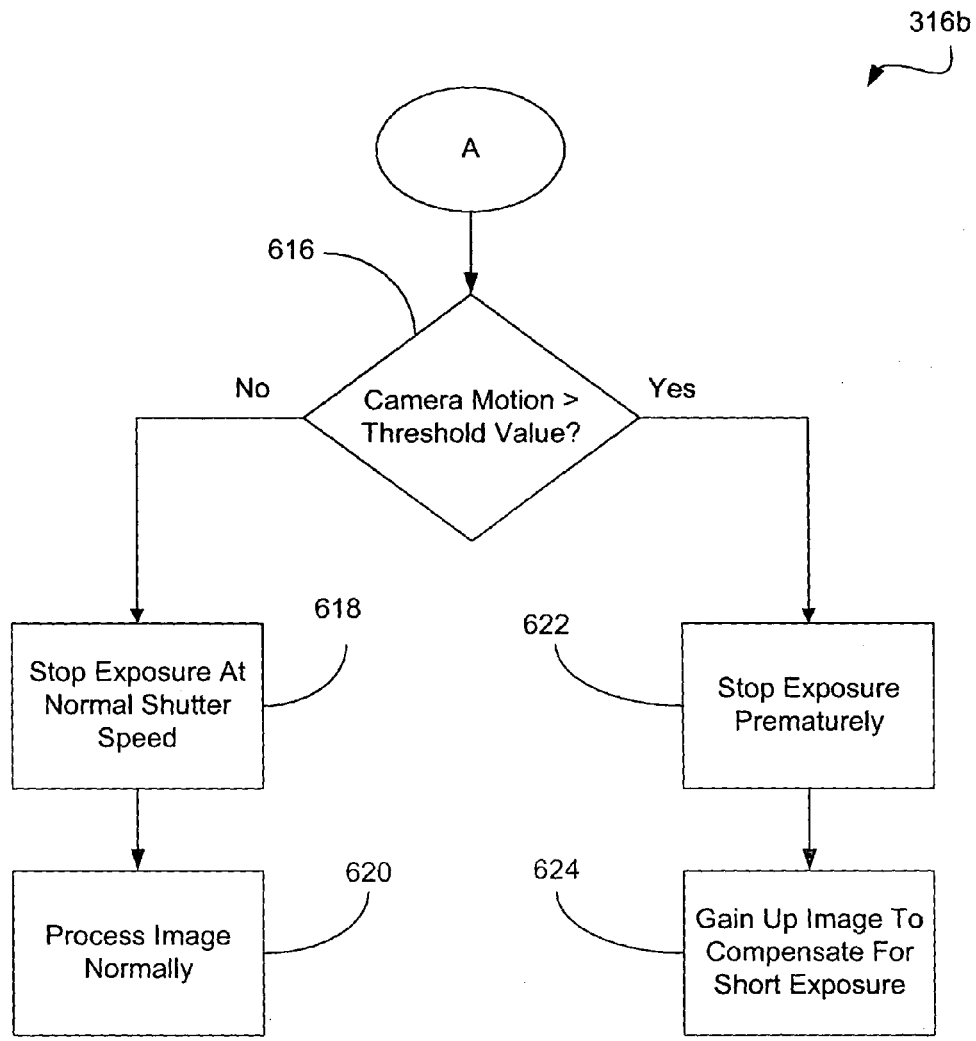

Continuing at node "A" from FIG. 6A to FIG. 6B, step 616 includes determining whether camera motion has exceeded a predetermined threshold value of motion. The threshold may be selected by the user via the motion interface 408, or programmed into the exposure module 316 (FIG. 3). If camera motion has not exceeded the threshold, step 618 includes stopping image exposure at normal (not premature) shutter speed and step 620 includes processing the image normally. If the camera motion has exceeded a threshold value ("yes" to step 616), step 622 includes stopping exposure prematurely and step 624 includes gaining up the image to compensate for the short exposure. Since this gain operation also amplifies noise, the image-exposure system 300 (FIG. 3) balances the perceived image degradation caused by the remaining motion blur and the degradation caused by the increased noise. The result is an optimized image under these conditions.

Any process descriptions or blocks in the flow charts of FIGS. 5 and 6 should be understood as representing modules, segments, or portions of code which include one or more executable instructions for implementing specific logical functions or steps in the process. Alternative implementations are intended to be included within the scope of the disclosed methods in which functions may be executed out of order from that shown or discussed, including substantially concurrently or in reverse order, depending on the functionality involved, as would be understood by those reasonably skilled in the art.

What is claimed is:

1. An image-exposure method, comprising:
   detecting motion by a motion detecting device; and
   determining when to terminate an image exposure based on pre-exposure detected motion of a camera, wherein the image exposure is not terminated in response to detecting camera motion associated with following a moving subject, and the image exposure is terminated in response to detecting motion that is not associated with the camera following the moving subject.

2. The method of claim 1, further including extending the image exposure to a predetermined maximum time of exposure according to at least one of a current lens aperture setting, current shutter speed setting, current sensor gain setting, and time lapse between shutter opening and closing positions when no motion is detected.

3. The method of claim 1, further including terminating the image exposure when a threshold amount of motion has been at least one of reached and exceeded.

4. The method of claim 3, further including increasing the gain of the underexposed image exposure to a nominal brightness level in response to terminating the image exposure.

5. The method of claim 3, wherein a threshold amount of motion is a function of focal length.

6. The method of claim 1, further including terminating the image exposure based on acceleration of the camera.

7. The method of claim 1, wherein detecting includes receiving pitch and yaw information from at least one of a gyroscope, a sensor, and an accelerometer.

8. The method of claim 1, wherein detecting includes comparing motion between successive frames read from a sensor.

9. An image-exposure system, comprising:
   a motion detecting device;
   a user interface configured to present a plurality of priority selection interfaces to a user, each of the priority selection interfaces enabling at least one fixed parameter and automatic setting of other parameters, the plurality of priority selection interfaces including a motion interface, a shutter interface, an aperture interface, and a sensor gain interface; and
   logic configured to determine, responsive to user selection of one of the plurality of priority selection interfaces, when to terminate an image exposure based on pre-exposure detected motion of a camera.

10. The system of claim 9, wherein the logic is configured to terminate the image exposure when a threshold amount of motion has been exceeded.

11. The system of claim 10, wherein the logic is configured to increase the gain of the underexposed image exposure to a nominal brightness level in response to terminating the image exposure.

12. The system of claim 10, wherein the threshold amount of motion is a function of focal length.

13. The system of claim 9, wherein the motion detecting device includes at least one of a gyroscope, a sensor, and an accelerometer.

14. The system of claim 9, wherein the motion detecting device includes a sensor that can be read by the logic to determine motion based on successive frames read from the sensor.

15. The system of claim 9, wherein the logic includes software stored in memory.

16. The system of claim 9, wherein the logic is embedded in a processor.

17. The system of claim 16, wherein the processor includes at least one of a camera controller and a microprocessor.

18. An image-exposure system, comprising:
    means for detecting motion;
    means for presenting a plurality of priority selection interfaces to a user, each of the priority selection interfaces enabling at least one fixed parameter and automatic setting of other parameters, the priority selection interfaces comprising a motion interface, a shutter interface, an aperture interface, and a sensor gain interface; and
    means for terminating, responsive to a user activating the motion interface, an image exposure based on whether a threshold level of pre-exposure detected motion of a camera has occurred.

19. The system of claim 18, further including means for determining whether the threshold level of motion has occurred.

20. The system of claim 18, wherein the means for detecting motion includes means for detecting rotational motion.

21. The system of claim 20, wherein the means for detecting rotational motion includes at least one of a gyroscope, a sensor, and an accelerometer.

22. The system of claim 18, wherein the means for detecting motion includes a sensor that supports a non-destructive read capability.

23. The system of claim 18, wherein the means for terminating includes logic configured as software.

24. The system of claim 18, wherein the means for terminating includes logic configured as hardware.

25. The system of claim 18, wherein the means for terminating includes logic embedded in at least one of a microprocessor and a camera controller.

26. The system of claim 18, wherein the means for terminating includes logic stored in memory.

27. A computer program for controlling image exposure, the computer program being stored on a non-transitory computer-readable medium, the computer program comprising:

logic configured to detect motion; and logic configured to terminate an image exposure based on pre-exposure detected motion of a camera, wherein the image exposure is only terminated for unintentional motion.

28. The computer program of claim 27, wherein the logic configured to detect motion includes logic configured to detect pitch and yaw motion of the camera.

29. The computer program of claim 27, wherein the logic configured to terminate the image exposure includes logic configured to provide for maximum allowed exposure times in the absence of motion.

30. The computer program of claim 27, wherein the logic configured to terminate the image exposure includes logic configured to gain-up the image exposure to provide a nominal brightness level responsive to terminating.

31. The computer program of claim 30, wherein the logic configured to gain-up the image exposure includes a programmable analog gain element that multiplies pixel values by a defined multiplier to compensate for a shortened exposure.

32. The computer program of claim 30, wherein the logic configured to gain-up the image exposure includes logic that instructs a processor to apply a defined multiplier to pixel values to compensate for a shortened exposure.

* * * * *